A. G. HAM.
QUACK GRASS OR WEED EXTERMINATOR.
APPLICATION FILED MAY 18, 1908.
901,533.
Patented Oct. 20, 1908.
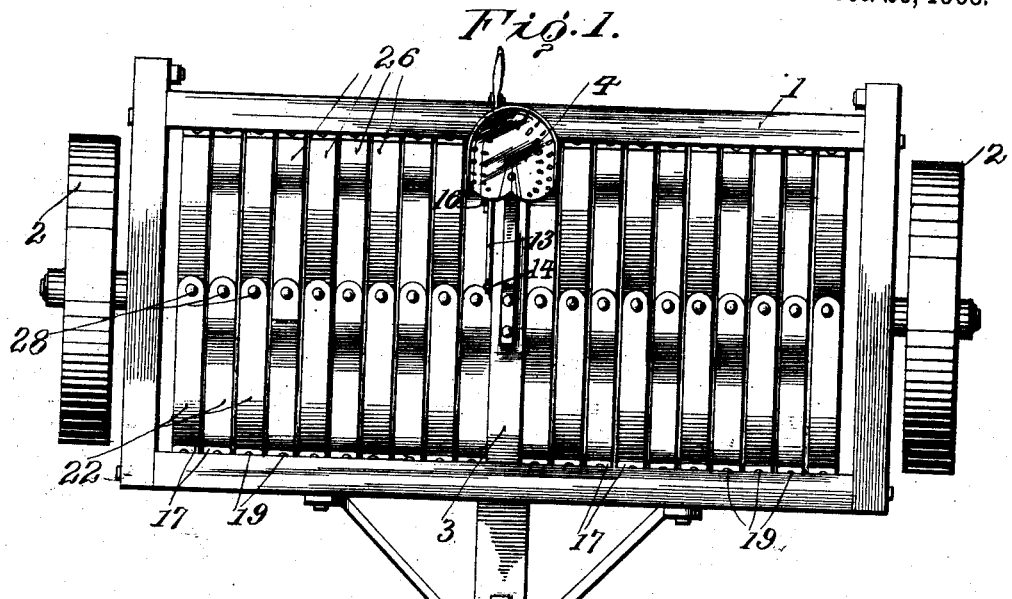
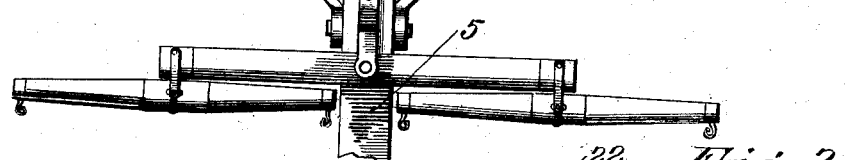
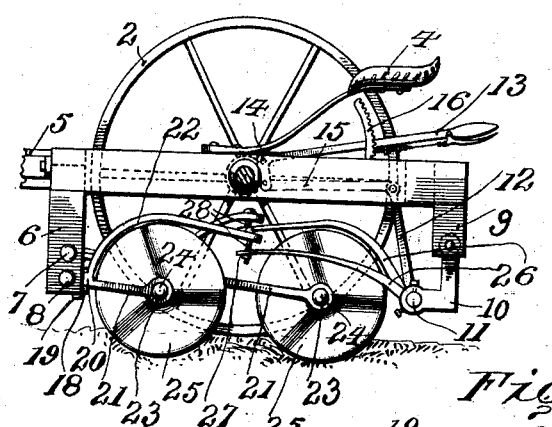
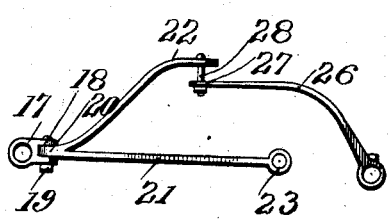
Witnesses.
Inventor.
Alva G. Ham.
by Dudley, Browne & Phelps
Attorney's

UNITED STATES PATENT OFFICE.

ALVA G. HAM, OF ROCHESTER, MINNESOTA.

QUACK-GRASS OR WEED EXTERMINATOR.

No. 901,533.     Specification of Letters Patent.     Patented Oct. 20, 1908.

Application filed May 18, 1908. Serial No. 433,503.

*To all whom it may concern:*

Be it known that I, ALVA G. HAM, a citizen of the United States, residing at Rochester, in the county of Olmsted and State of Minnesota, have invented certain new and useful Improvements in Quack-Grass or Weed Exterminators, of which the following is a specification.

My invention relates to certain new and useful improvements in quack grass or weed exterminators, and the object of my invention is to produce a device of this character which will be simple in construction and effective in operation.

I have found that if the surface of the ground in which weeds or quack grass are growing be cut up as by rotary colters, set close together and then the surface harrowed, that the roots of the weeds or quack grass will be injured and by being turned up on the surface of the ground will dry up thus killing the weeds or grass. In some cases I find it advantageous to traverse the ground with the cutters in several directions before harrowing, in order to more thoroughly cut up the surface and enable the harrow to more thoroughly pulverize the ground.

In order to properly cut up or slice the surface of the ground I have invented a construction involving a gang of rotary colters mounted in a manner which particularly adapts the construction to my purpose.

With these objects in view my invention consists in certain constructions, combinations, and arrangements of parts the preferred form of which will be first described in connection with the accompanying drawings and then the invention particularly pointed out in the claims.

Referring to the drawings wherein the same part is designated by the same reference numeral wherever it occurs, Figure 1 is a top plan view of a machine constructed in accordance with my invention. Fig. 2 is a side elevation thereof, with the wheel removed. Fig. 3 is a detail of one of the colter supports, Fig. 4 is a detail view of another colter support, and Fig. 5 is a top plan view of a portion of one of the colter supports.

1 designates a rectangular frame supported at its ends by the wheels 2, provided centrally with the cross brace 3 on which the driver's seat 4 is mounted, and to the front of the frame is attached the draft device 5. These parts may be constructed in any other form that may be found desirable as their particular construction forms no part of my invention.

Depending from the front edge of the frame 1 are a pair of shaft supports 6 in which are mounted the shafts 7 and 8.

Depending from a pair of blocks 9 at the rear of the frame are a pair of L-shaped brackets 10 in the lower ends of which is journaled a shaft 11 from which upwardly extends the arm 12.

13 is a lever pivoted at 14 to the cross brace 3 and connected at its lower end by a link 15 to the upper end of the arm 12.

16 is a notched locking bar with the notches of which the lever 13 is adapted to engage.

Loosely mounted on the shaft 7 are a series of blocks 17. These blocks are slotted at 18 and in each of these slots is secured by means of a bolt 19, a head 20 of a colter support which is formed of a lower straight arm 21 and an upper curved arm 22. The arm 21 near its end is split and in the outer end is formed a pair of bearings 23 in which is journaled the shaft 24 of a rotary colter 25. Mounted on the shaft 8 are a similar series of colter supports which are arranged in alternate relation to the supports on the shaft 7. The lower arm of the supports is shorter than the lower arm of the supports on the shaft 7 and the upper arm is curved so that it will extend over the colter carried in the lower arm. When these parts are assembled it will be seen that there will be two transverse rows of colters one row being located behind the other as shown in Fig. 2 the colters alternating across the machine.

Fast on the shaft 11 are a series of forwardly extending spring arms 26 equal in number to the total number of colter supports. The outer ends of these arms are each provided with an opening 27 through which loosely passes a bolt 28 carried in the outer end of each arm 22. These bolts 28 are preferably and as shown of such length as to permit of play between the arms 22 and 26.

From the above described construction it will be seen that when the operating lever 13 is latched in the position shown in Fig. 2, the colters will all be held down in contact with the ground by the action of the spring arms 26, but each of the colters can move vertically independently of each of the others to compensate for any inequalities in the surface of the ground. When it is desired to lift the colters out of contact with the ground the lever 13 is thrown forward and this operates through the shaft 11 to raise the spring arms 26 which move up into contact with the ends of the arms 22 and raise the same, thus raising the colters.

While I have described my invention as being applied to weed exterminators it is to be understood that my invention is not to be limited to such use as it is equally well adapted for use in connection with other agricultural or like machinery.

I realize that considerable variation is possible in the details of construction and arrangement of parts without departing from the spirit of my invention, and I therefore do not intend to limit myself to the specific form shown and described.

What I claim as new and desire to secure by Letters Patent is:

1. In a weed exterminator or the like, the combination with a frame of a shaft carried by the frame, a series of supports loose on the shaft, a series of colters one mounted in each support, a rock shaft mounted on the frame, a series of spring arms fast on the rock shaft each connected to a colter support and means connected to the rock shaft for operating the same.

2. In a weed exterminator or the like, the combination with a frame of two shafts carried by the frame, a series of supports loose on said shafts, said supports being formed into two series, rotary colters one mounted in each support, with the colters mounted in one series of supports behind the colters of the other series of supports, a rock shaft mounted on the frame, a series of spring arms fast on the rock shaft each connected to a colter support and means connected to the rock shaft for operating the same.

3. In a weed exterminator or the like, the combination with a frame, of a shaft carried by the frame, a series of supports loose on the shaft each support being formed with two arms, a series of colters one mounted in one arm of each support, a rock shaft mounted on the frame, a series of spring arms fast on the rock shaft, each connected to the other arm of the colter supports, and means connected to the rock shaft for operating the same.

In testimony whereof I affix my signature in presence of two witnesses.

ALVA G. HAM.

Witnesses:
MINNIE BOULTER,
LILIAN FRASER.